(12) United States Patent
Haf et al.

(10) Patent No.: US 11,820,200 B2
(45) Date of Patent: Nov. 21, 2023

(54) AIR TREATMENT APPARATUS

(71) Applicant: AGCO International GmbH, Neuhausen (CH)

(72) Inventors: Dietmar Haf, Marktoberdorf (DE); Andreas Stieglitz, Marktoberdorf (DE)

(73) Assignee: AGCO International Gmbh, Neuhausen (CH)

( * ) Notice: Subject to any disclaimer, the term of this patent is extended or adjusted under 35 U.S.C. 154(b) by 408 days.

(21) Appl. No.: 17/116,990

(22) Filed: Dec. 9, 2020

(65) Prior Publication Data

US 2021/0170828 A1    Jun. 10, 2021

(30) Foreign Application Priority Data

Dec. 9, 2019   (GB) ..................... 1917952

(51) Int. Cl.
  *B60H 3/06*  (2006.01)
  *B60H 1/00*  (2006.01)
  *B62D 49/06*  (2006.01)

(52) U.S. Cl.
  CPC ....... *B60H 1/00378* (2013.01); *B60H 3/0658* (2013.01); *B62D 49/06* (2013.01)

(58) Field of Classification Search
  CPC ............ B60H 1/00378; B60H 3/0641; B60H 3/0658; B62D 49/06
  See application file for complete search history.

(56) References Cited

U.S. PATENT DOCUMENTS

| | | | | |
|---|---|---|---|---|
| 4,072,487 A | * | 2/1978 | Irwin | ............... B60H 1/00378 454/151 |
| 6,780,097 B2 | * | 8/2004 | Shuttleworth | ..... B60H 1/00378 454/158 |
| 2003/0045225 A1 | | 3/2003 | Ruckert et al. | |
| 2018/0178619 A1 | * | 6/2018 | Guitart Corominas | ..................... B60H 1/00735 |
| 2019/0322322 A1 | | 10/2019 | Jha et al. | |

(Continued)

FOREIGN PATENT DOCUMENTS

| | | |
|---|---|---|
| EP | 3 173 266 A1 | 5/2017 |
| WO | 2015/159248 A | 10/2015 |
| WO | 2016/005401 A | 1/2016 |

OTHER PUBLICATIONS

UK Intellectual Property Office, Search Report for UK priority Application No. GB 1917952.2, dated May 29, 2020.

(Continued)

*Primary Examiner* — Gonzalo Laguarda (57) ABSTRACT

An agricultural vehicle has an operator environment with a roof portion, and an air treatment apparatus installed within the roof portion. The air treatment apparatus includes a vehicle HVAC system having an inlet plenum, other HVAC components and an outlet to the operator environment. The air treatment apparatus further includes an air filtration system having at least one external inlet and first and second filtration devices located between the external inlet and the HVAC inlet plenum. The roof portion is a hollow structure having upper and lower surfaces and front, rear, left and right sidewalls, and the first and second air filtration devices are disposed along one of the left and right sidewalls within the hollow structure of the roof portion. The HVAC system is preferably disposed along the rear sidewall within the hollow structure of the roof portion.

10 Claims, 5 Drawing Sheets

(56) References Cited

U.S. PATENT DOCUMENTS

2021/0070149 A1\* 3/2021 Toppani .............. B60H 3/0658
2021/0086582 A1\* 3/2021 Haf ................... B60H 1/00378
2021/0188052 A1\* 6/2021 Haf ................... B60H 1/00378

OTHER PUBLICATIONS

European Patent Office, OA and Search Report prepared for related EP Application No. EP20 20 8741, dated May 3, 2021.

\* cited by examiner

AIR TREATMENT APPARATUS

BACKGROUND

Field

The present invention relates to an air treatment apparatus, in particular to an air treatment apparatus for an operator environment or cab of an agricultural vehicle or a similar vehicle.

Description of Related Art

Agricultural vehicles are known to operate in environments in which many different kinds of particulate or contaminant are present. This creates a requirement for filtration of the air for operators of such vehicles when in use. The particulates may be of different sizes and of different natures, for example larger particulates such as dust, pollen and the like and smaller contaminants such as fumes, aerosols and vapours.

It is known to provide separate air filters to provide selective filtering of the air supply to a vehicle operator. For example a first filter may be used when the predominant contaminant in the working environment of the agricultural vehicle is relatively large (for example when traversing a field) and a second filter is used when the predominant contaminant in the working environment is relatively small (for example when applying a herbicide, pesticide or similar).

Also, legislation in various countries now requires the use of filters of a particular rating to filter out particular contaminants from the air which would otherwise be introduced into the operator environment or cab of the agricultural vehicle. For example in the EU, EU Standard EN 15695 provides for four categories of filter for cabin protection, where Category 2 (hereinafter "CAT2") protects only against dust but does not protect against aerosols and vapours, Category 3 (CAT3) protects against dust and aerosol, but not vapours and Category 4 (CAT4) protects against dust, aerosols and vapours. In this context, CAT3 filters tend to be more expensive than CAT2 filters, with CAT4 being most expensive. Accordingly, it is beneficial to the working life of the higher rated filters if they can be cleaned rather than replaced. It is a further advantage if such filters can be cleaned when in service on the agricultural vehicle rather than being removed while being cleaned (requiring replacement during cleaning or enforced downtime of the agricultural vehicle).

It is also desirable to minimise the space occupied by air treatment systems in an agricultural vehicle and improve user access.

SUMMARY

In accordance with the present invention there is provided an agricultural vehicle comprising an operator environment having a roof portion, and an air treatment apparatus installed within the roof portion, wherein the air treatment apparatus comprises:

a vehicle HVAC system having an inlet plenum, other HVAC components and an outlet to the operator environment; and an air filtration system having at least one external inlet and at least one filtration device located between the external inlet and the HVAC inlet plenum;

wherein the roof portion is a hollow structure having upper and lower surfaces and front, rear, left and right sidewalls, and components of the air treatment apparatus are disposed along one of the left and right sidewalls within the hollow structure of the roof portion.

In an embodiment, there are two filtration devices, both being disposed along one of the left and right sidewalls within the hollow structure of the roof.

In accordance with another aspect of the present invention there is provided an agricultural vehicle comprising an operator environment having a roof portion, and an air treatment apparatus installed within the roof portion, wherein the air treatment apparatus comprises:

a vehicle HVAC system having an inlet plenum, other HVAC components and an outlet to the operator environment; and an air filtration system having at least one external inlet and including first and second filtration devices located between the external inlet and the HVAC inlet plenum;

wherein the roof portion is a hollow structure having upper and lower surfaces and front, rear, left and right sidewalls, and the first and second filtration devices are both disposed along one of the left and right sidewalls within the hollow structure of the roof portion.

This arrangement facilitates user access to the filtration devices without undue intrusion into user headroom within the operator environment or cab.

Preferably, the first filtration device is adapted to filter dust particles and conforms to CAT2. Preferably, the second filtration device is adapted to filter dust, aerosols and vapour and conforms to CAT4.

Each of the filtration devices may be cylindrical, having a longitudinal axis, the first and second filtration devices being mounted with their longitudinal axes aligned. The longitudinal axes of the first and second filtration devices may be aligned with one another and with a longitudinal direction of the vehicle.

In an embodiment, the air treatment apparatus comprises a first blower connecting the filtration devices and the HVAC system inlet plenum, the first blower being connected to each of the filtration devices by a respective duct.

In an embodiment, the air filtration system comprises a valve mechanism selectively to connect either the first filtration device to the HVAC inlet plenum or the second filtration device to the inlet HVAC plenum. The valve mechanism may be located between the first and second filtration devices. Where the first blower is connected to each of the filtration devices by a respective duct, the valve mechanism may comprise one or more flap valves arranged in the ducting between the first blower and the filtration devices. The first blower may be positioned between the first and second filtration devices. The first and second filtration devices may have outlets which face one another with the first blower positioned between the outlets of the first and second filtration devices.

In an embodiment, the HVAC system is disposed along the rear sidewall within the hollow structure of the roof portion. In this embodiment, the air treatment system is disposed along one side and adjacent the rear wall of the hollow structure of the roof portion and avoids undue intrusion into user headroom within the operator environment or cab. The air filtration system may be located towards a rear end of said one of the left and right sidewalls.

In an embodiment, the air treatment apparatus includes a second blower configured to produce a higher throughput of air than the first blower, the inlet of the second blower being connected in series with the outlet of the first blower, the second blower being disposed adjacent one of the first and second filtration devices. The second blower may be positioned physically between one of the first and second filtration devices and the HVAC system.

Preferably, the at least one external inlet comprises an opening in the lower surface of the hollow structure of the roof portion proximate said one of the left and right sidewalls, and may suitably be positioned directly below the at least one of the first and second filtration devices. In an embodiment, there are two external inlets, each being positioned directly below a respective one of the first and second filtration devices.

One or more user-openable hatches may be provided in said one of the left and right sidewalls to provide user access to one or more components of the air treatment apparatus, for example one hatch for each filtration device fitted. In an embodiment, there are two user-openable hatches, each providing user access to a respective one of the first and second filtration devices. The, or each, user-openable hatch may extend to cover part of the sidewall and part of the upper surface.

In an embodiment, the air filtration system includes at least one blower between the filtration devices and the HVAC system with a recirculation line having an inlet drawing air from the operator environment and an outlet upstream of the at least one blower. In such an arrangement, where the HVAC system is connected to the air filtration system via a duct, the recirculation line may comprise an air channel from said duct to the interior of the operator environment. A further filtration device may be provided in the recirculation line air channel or its inlet.

BRIEF DESCRIPTION OF THE DRAWINGS

The invention will now be described, by way of example only, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
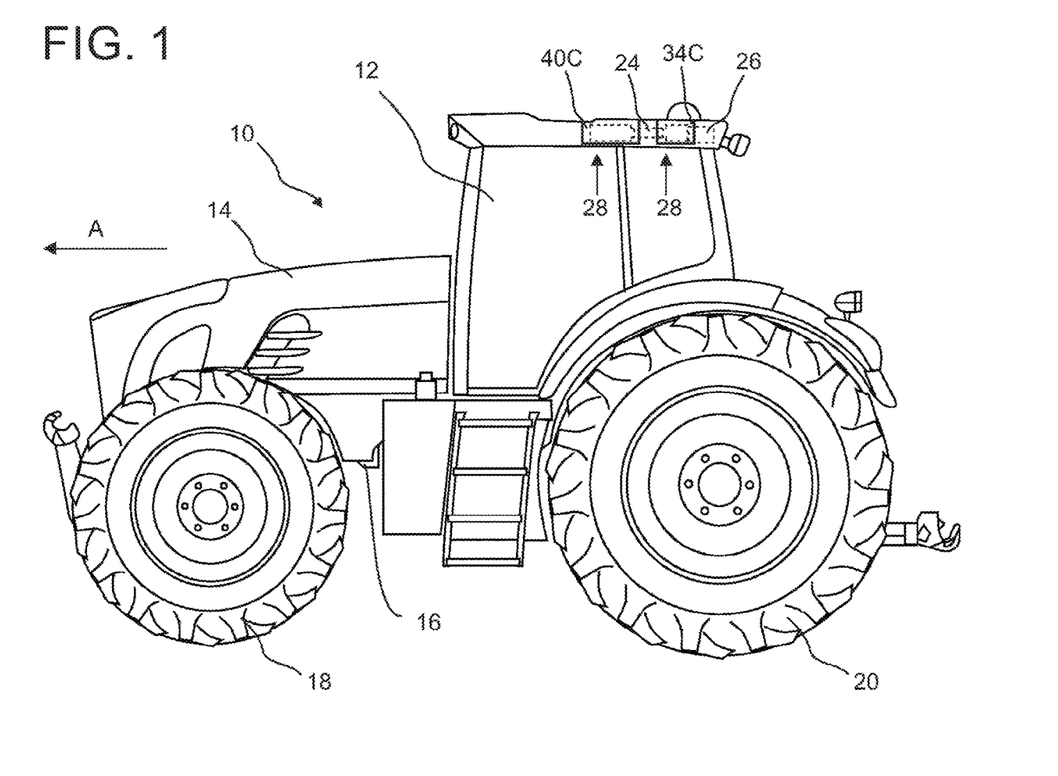
FIG. 1 shows a utility vehicle in the form of a farm tractor including an air filtration apparatus.

Referring to FIG. 1, an agricultural/utility vehicle in the form of a tractor 10 is shown having an operator environment in the form of a cab 12 and an engine compartment 14. A chassis 16 which is partly visible connects front wheel suspension and steering assembly 18 and rear axle assembly 20. The cab 12 has a roof assembly 22 within which is mounted an air filtration apparatus 24 and HVAC (heating, ventilation and air conditioning) unit 26. Two inlets (represented by arrows 28) for the air filtration apparatus and HVAC unit are located under an eaves overhang on a side of the roof assembly 22, although it will be appreciated that a single inlet may alternately be provided. Openable covers 40C, 34C in a side wall of the roof assembly 22 enable user access for inspection and/or replacement of respective filtration devices, as described further below.

Figure 2:
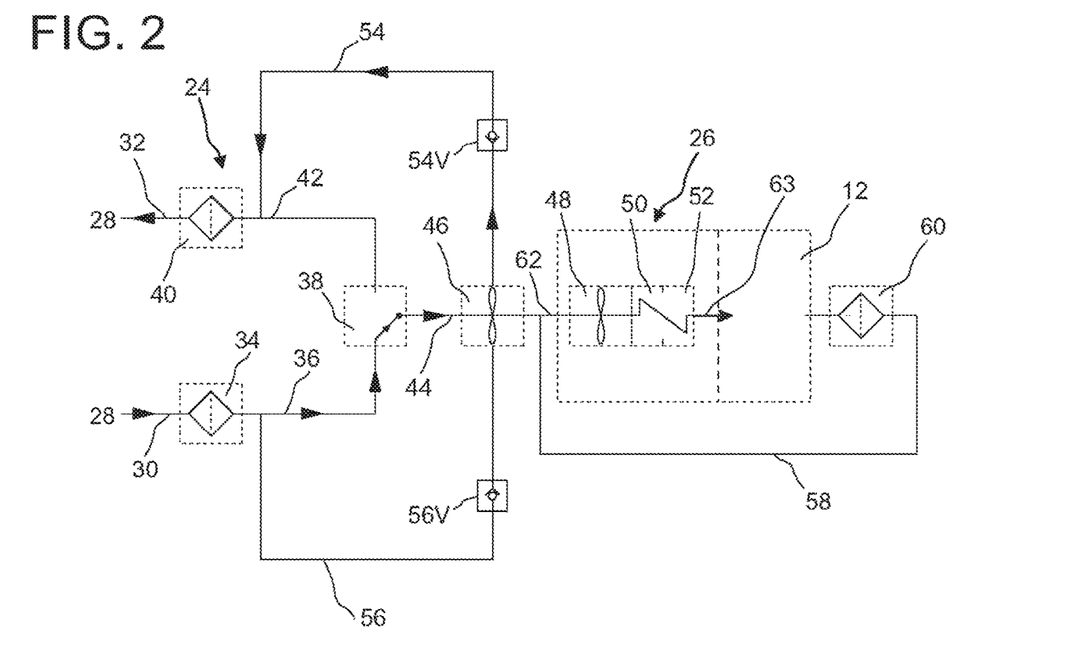
FIG. 2 shows a schematic view of a first embodiment of an air filtration apparatus in in a first operating condition.
Figure 3:
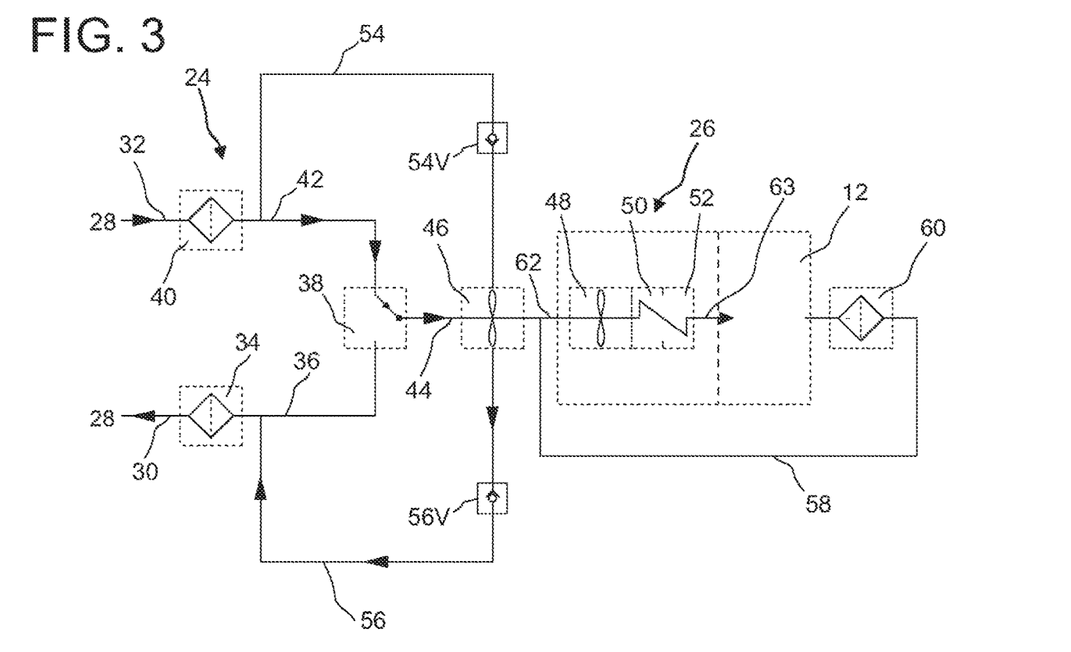
FIG. 3 shows a schematic view of the air filtration apparatus of FIG. 2 in a second operating condition.

With reference to FIGS. 2 and 3, a schematic view of a first embodiment of an air filtration apparatus is shown comprising the air filtration system indicated generally at 24 (to the left of the figure) connected to the HVAC system indicated generally at 26 (to the right of the figure) for the operator environment or cab 12 of the agricultural vehicle 10.

The external inlet or inlets 28 feed a first vent or duct 30 and a second vent or duct 32 by which air to be filtered is drawn into the filtration system. As mentioned above, the first and second vents or ducts 30, 32 may be provided with individual external inlets 28 in a preferred arrangement, or may share a common inlet.

The first vent or duct 30 is directed to a first filtration device 34 having a first coarser level of filtration. The first filtration device 34 is conveniently suitable for extracting dust particles and the like from the externally fed air. By way of example, this may be a Category 2 (CAT2) dust filter. The first filtration device 34 is provided with an outlet 36. The outlet 36 is connected to a first inlet side of a valve mechanism 38.

The second vent or duct 32 is directed to a second filtration device 40 having a second finer level of filtration. The second filtration device 40 is conveniently suitable for extracting dust, aerosols, vapour and the like from the externally fed air. By way of example, this may be a Category 4 (CAT4) filter. The second filtration device 40 is provided with an outlet 42, which outlet 42 is connected to a second inlet side of the valve mechanism 38.

The valve mechanism 38 is provided with an outlet conduit 44. The valve mechanism allows air flow from the second filtration device 40 to the outlet conduit 44 while isolating the first filtration device 34 or, alternatively allows air flow from the first filtration device 34 to the outlet conduit 44 while isolating the second filtration device 40.

The valve mechanism 38 may be operated by any convenient means, for example automatically following a suitable signal received from a suitable sensor, automatically following actuation of a suitable device for example a sprayer, or by the direct action of a driver actuating suitable means within the cab.

The outlet conduit 44 is connected to an inlet plenum of a first fan or air impeller device, pressurisation blower 46, the output of which is connected to the input of a second fan or air impeller device, main blower 48, of the HVAC system 26.

The HVAC system typically includes additional components downstream of the main blower 48, such as by way of example a evaporator 50 and a heater 52 (see also description of FIG. 7 below), the output of which directs the treated air flow to the cab 12 by way of a cabin air supply duct 63.

In this first embodiment, a first (inlet) end of a first bypass channel or passage 54 is connected to an outlet of the pressurisation blower 46. A second (outlet) end of the first bypass channel or passage 54 is located between the second filtration device 40 and the valve mechanism 38. A non-return valve 54V is provided in the bypass channel 54 opposing the flow of air from the second to the first ends.

Also, a first (inlet) end of a second bypass channel or passage 56 is connected to an outlet of the pressurisation blower 46. A second (outlet) end of the second bypass channel or passage 56 is located between the first filtration device 34 and the valve mechanism 38. As for the first bypass, a non-return valve 56V is provided in the bypass channel 56 opposing the flow of air from the second to the first ends.

An air recirculation path 58 is provided by a conduit extending between the cab 12 and the inlet to the main blower 48 as will be described further below. The further air recirculation path 58 suitably includes a dust filter 60 (preferably in the form of a simple cartridge filter easily replaceable by a user) to prevent dust from the ambient air within the cab 12 from being passed to the main blower 48 and downstream components 50, 52 and thereby reintroduced to the cab.

The typical operating position of the valve mechanism 38 is that shown in FIG. 2, with inlet air drawn through the first coarser CAT2 filtration device 34. However, when there is a need to extract aerosols, vapour and the like the system is switched to the configuration shown in FIG. 3 with inlet air drawn through the second finer CAT4 filtration device 40.

To adopt the configuration shown in FIG. 3, the valve mechanism 38 is moved to the position shown and the pressurisation and main system blowers 46, 48 are also actuated. Air is drawn into the air filtration system through the second vent or duct 32 and drawn through the second CAT4 filtration device 40 to remove dust, aerosols, vapour and the like entrained in the air. The air is directed through the valve mechanism 38 to the outlet conduit 44 and then drawn by the pressurisation and main blowers 46, 48 into the HVAC system and onward via the additional components 50, 52 to the cab air supply duct. In this position, the valve mechanism 38 prevents communication between the first filtration device 34 and the blowers 46, 48.

In addition, due to the overpressure of a portion of the air drawn into the HVAC system is drawn or recirculated through the bypass channel or passage 56 to the region between the first filtration unit 34 and the ventilation mechanism 38 where, due to the closed state of the valve, the recirculated air is directed back through the first filtration device 34, thereby removing trapped dust and the like from the first filtration device 34 and directing these back out through vent or duct 30 and inlet 28. For this reason, separate inlets 28 for the ducts 30, 32 are preferred to reduce the risk of ejected particulate matter from one filter being drawn into the other.

This arrangement has as an advantage that the air filtered by the second filtration device 40 is used to clean the first filtration device 34. It can be seen that the first filtration device 34 is being cleaned whenever the second filtration device 40 is in operation. It is a further advantage, with the second filtration device 40 connected to the HVAC system, that the use of the portion of the treated air to clean the first filtration device 34 results in a gentler cleaning action than if the pressurisation blower 46 was simply reversed to drive air back through the first filtration device 34. This results in a prolonged life for the first filtration device 34.

Once the need to extract aerosols, vapour and the like has passed, the valve mechanism 38 is caused to adopt the position shown in FIG. 2. In this position, the valve mechanism 38 prevents air flowing from the second filtration device 40 to the pressurisation blower 46 and on to the inlet plenum of the main blower 48.

Air is drawn into the air filtration system from the inlet 28 through the first vent or duct 30 and directed through the first filtration device 34 to remove dust and the like entrained in the air. The air passes through the valve mechanism 38 to its outlet conduit 44 and is then drawn by the pressurisation and main blowers 46, 48 into the HVAC system and (via components 50, 52) out through the cab air supply duct.

As before, due to the overpressure a portion of the air drawn into the HVAC system by the pressurisation blower 46 is drawn or recirculated through the second bypass channel or passage 56 to the region between the second filtration unit 40 and the valve mechanism 38, where, due to the closed state of the valve, the recirculated air is directed back through the second filtration device 40, thereby removing trapped dust, vapour and aerosol particles and the like from the second filtration device 40 and directing these back out through vent or duct 32 and inlet 28.

This has as an advantage that the air filtered by the first filtration device 34 is used to clean the second filtration device 40. It can be seen that the second filtration device 40 is being cleaned whenever the first filtration device 34 is in operation. As before it is a further advantage that the use of the portion of the treated air to clean the second filtration device 40 results in a gentler cleaning action than if the pressurisation blower 46 associated with the second filtration device 40 was simply reversed to drive air back through the second filtration device 40. This results in a prolonged life for the second filtration device 40.

Figure 4:
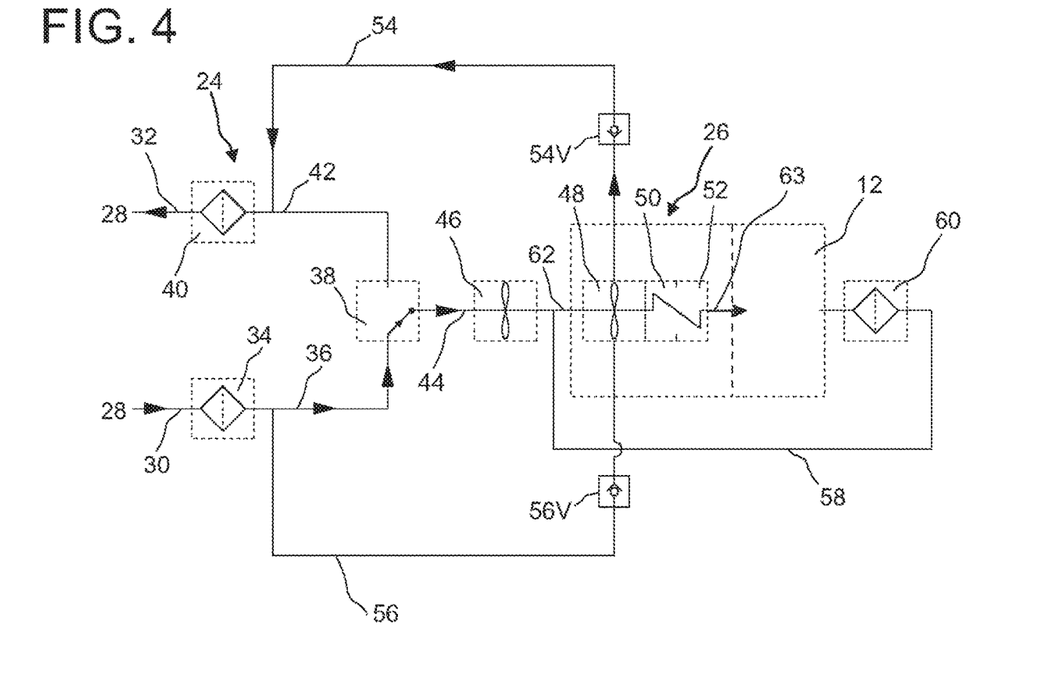
FIG. 4 shows a schematic view of a second embodiment of an air filtration apparatus.

A second embodiment of an air treatment apparatus is shown in FIG. 4. Like reference numerals are used to refer to like parts. The difference in this embodiment is that the inlets to the two bypass channels 54, 56 are fed from the main blower 48 (rather than the pressurisation blower 46).

Figure 5:
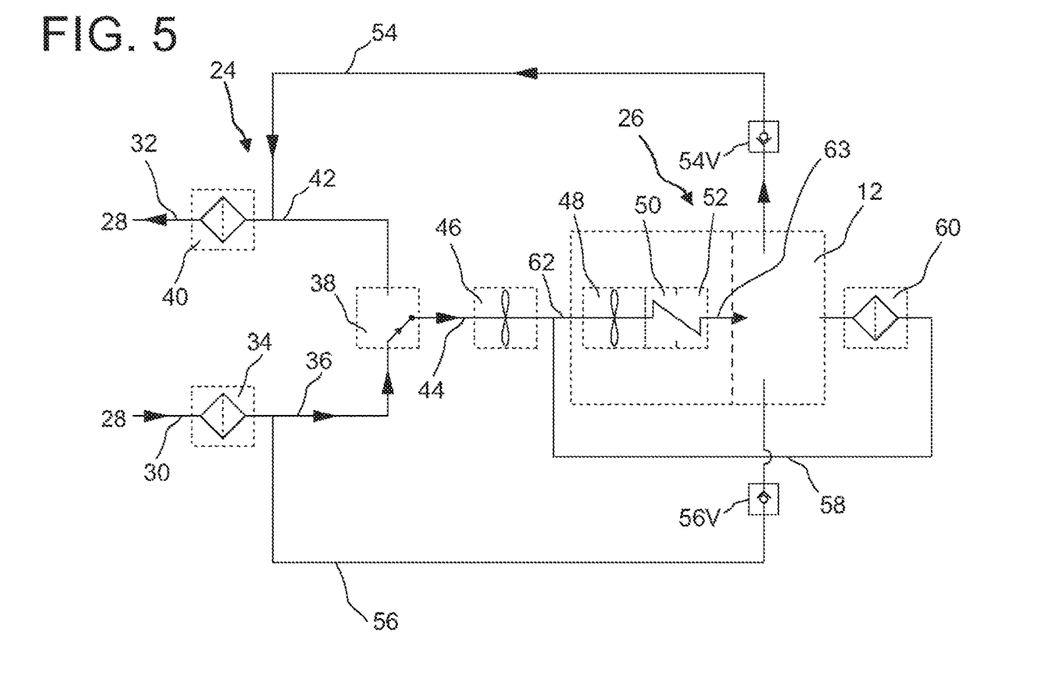
FIG. 5 shows a schematic view of a third embodiment of an air filtration apparatus.
Figure 7:
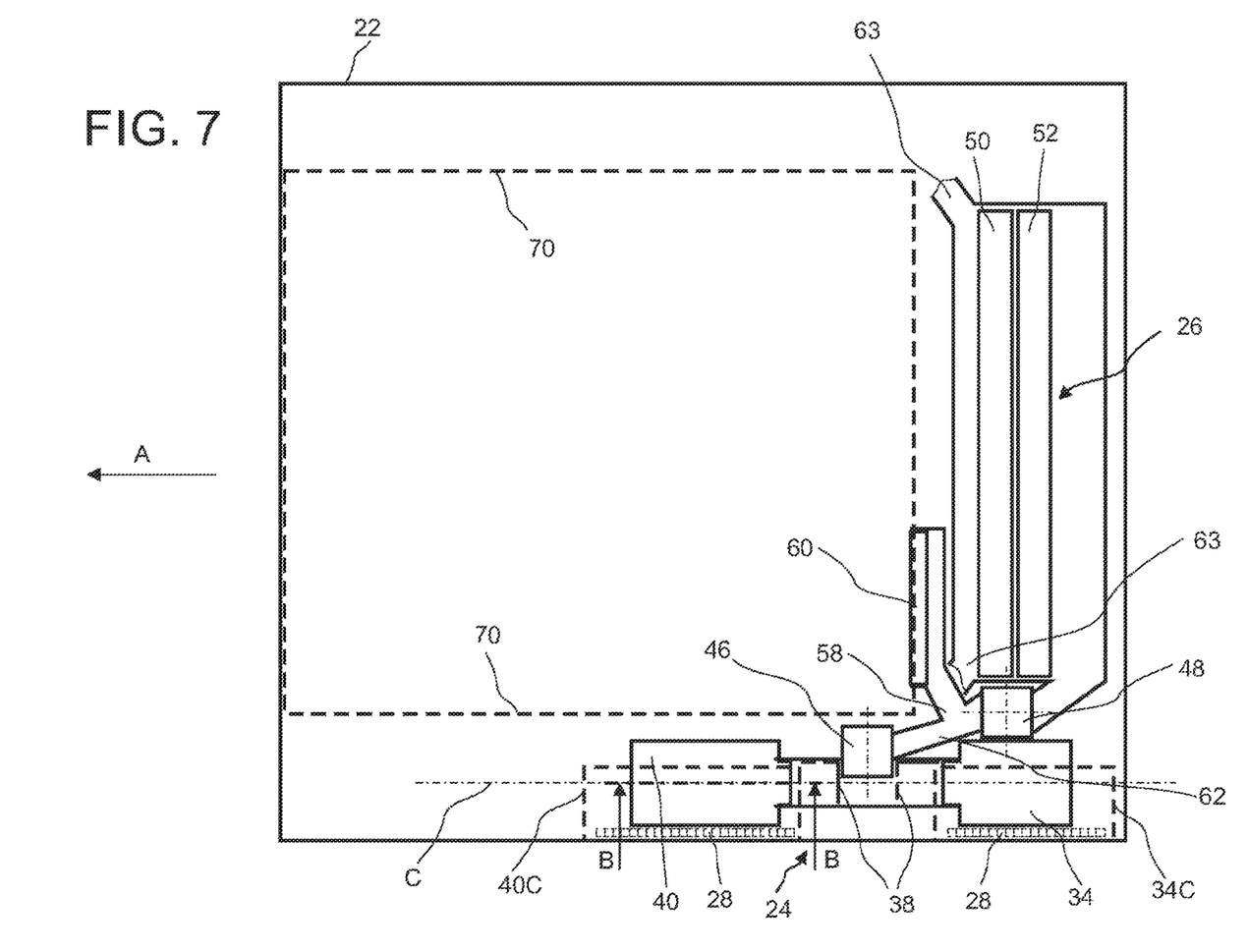
FIG. 7 schematically represents the layout of components of the air filtration apparatus installed in the roof of the tractor of FIG. 1.

A third embodiment of an air treatment apparatus is shown in FIG. 5. Like reference numerals are used to refer to like parts. The difference in this embodiment is that the inlets to the two bypass channels 54, 56 are fed by overpressure from the cab space 12 (rather than directly from the pressurisation or main blowers 46, 48). Alternatively, the overpressure could be taken from duct 63 connecting the HVAC unit 26 and the cab space 12 as shown in FIG. 7. The overpressure may also arise from the cab door being shut.

The presence of non-return valves 54V, 56V in bypass channels 54, 56 ensures that no air can pass from air filtration apparatus 24 to HVAC unit 26 through bypass channels 54, 56 directly in a direction opposite to the direction of the overpressure provided by plenum or main blowers 46, 48 or present in cab 12.

Figure 6A:
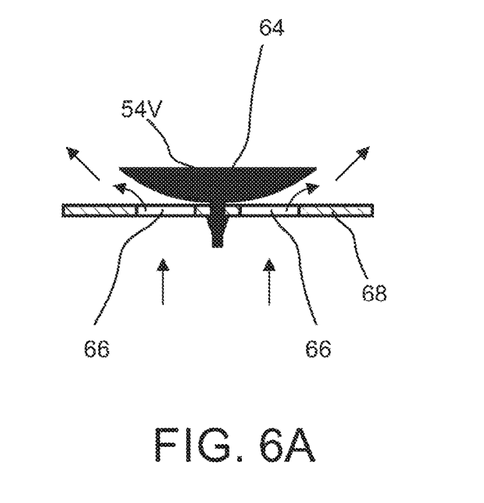
FIGS. 6A and 6B illustrate a non-return valve used in the air filtration apparatuses of FIGS. 2 to 5.
Figure 6B:
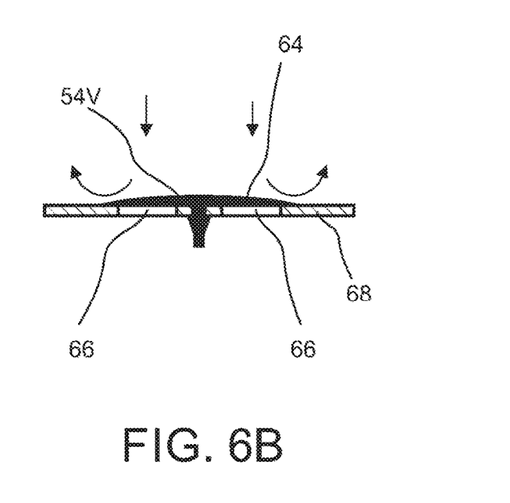

FIGS. 6A and 6B show a suitable configuration for the non-return valves 54V, 56V in the respective bypass lines 54, 56. A deformable disc of silicone rubber 64 is positioned over one or more apertures 66 in a surface 68 which otherwise provides an air blockage. As shown in FIG. 6A, air pressure from a first (lower) side of the surface (being in communication with plenum or main blowers 46, 48 or present in cab 12) is sufficient to cause the disc 64 to deform, opening the apertures 66 and allowing airflow. However, as shown in FIG. 6B, air pressure on the second (upper) side (being in communication with outlets 36, 42 of filtration device 34, 40) of the surface 68 serves to hold the disc 64 against the surface 68, thereby sealing the apertures 66. Alternatively, non-return valves 54V, 56V may be designed as flap-type non-return valve comprising a flap which is kept closed by a biasing spring in one direction while in the other direction, the flap can be opened against the force of the spring.

FIG. 7 is a schematic plan, looking down from above, of a preferred layout of the system components within the roof 22. The front of the tractor 10, and the usual direction of travel, is indicated by the arrow A. Arrow A is also indicative of the longitudinal axis of the vehicle.

The first and second filters 34, 40 are mounted to one side of the roof with the pressurisation blower 46 located between. In this case cylindrical filters with the filter medium arranged in circumferential orientation around an axis indicated with arrow C are installed, whereby the axis C is aligned longitudinal in driving direction A. Inlets 28 to the filters 34, 40 are represented by arrows 28. The physical inlets 28 are positioned below the respective filters in an underside of the roof assembly 22 forming an eaves projection outside of the cab 12. Openable covers 34C, 40C in the roof assembly enable user access to the respective filter devices 34, 40 for inspection, maintenance or replacement purposes. Whilst the opening to receive a filter device may just appear in the sidewall, a preferred arrangement (described below with reference to FIGS. 8A and 8B) has the opening extending also into an edge of the upper surface and the cover being shaped to close this extended opening. Controlled flaps in the conduit linking the filters 34, 40 to the pressurisation blower provide the valve mechanism 38 which controllably connects either of the filters 34, 40 to the pressurisation blower.

Adjacent one of the filters 34, 40 to the rear of the roof 22, and in between one of the filters 34, 40 and the HVAC unit 26, is the main blower 48 connected to the pressurisation blower 46 via duct 62. The output from the main blower 48 is passed through the additional components in the form of evaporator 52 and heater 50, which components extend across the rear of the cab roof, before the treated air enters the cab space 12. An opening from the cab space 12 into the duct 62 provides the recirculation path 58 as described above.

The layout of FIG. 7 provides a first benefit in that the inlets 28 for the first and second filtration devices 34, 40 are under an eaves overhang at the side of the roof which tends to being a less dusty environment than the front or rear and helps to reduce the volume of airborne material drawn into the filters. Secondly, the position of first and second filtration devices 34, 40 along one side of the cab eases access for the operator. A third benefit of having the filtration system and HVAC components mounted around the periphery of the cab roof 22 is that it enables a clearance area (indicated generally by dashed line 70) giving improved user headroom in the centre of the cab. Furthermore, positioning the main blower 48 adjacent (to the side of) the one of the filters 34, 40, preferably adjacent the filter which is at the rear end, and in between one of the filters 34, 40 and the HVAC unit 26, reduces the installation space in the rear of the cab to enlarge the clearance area.

Figure 8A:
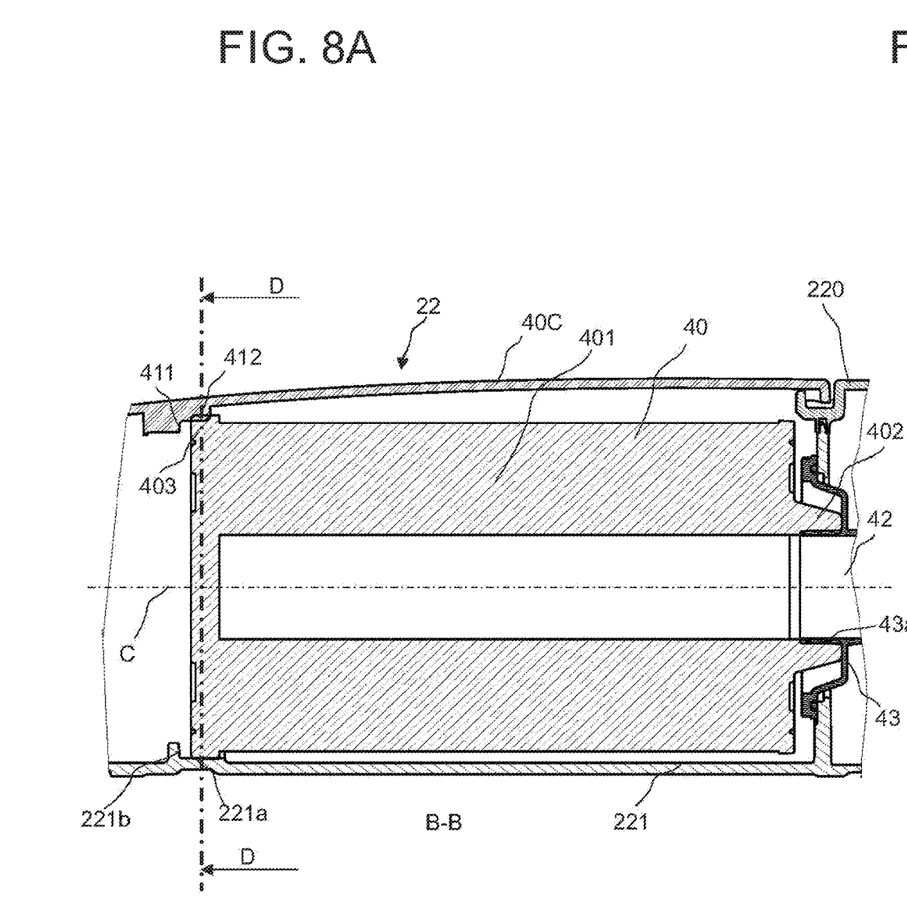
FIG. 8A shows a sectional view through the filter unit indicated with Arrows B-B in FIG. 7.
Figure 8B:
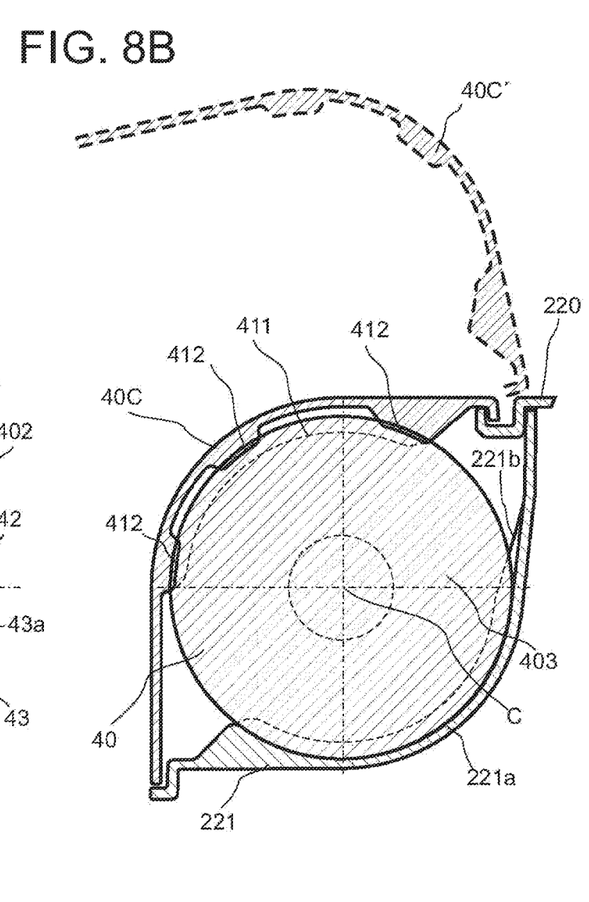
FIG. 8B shows a sectional view through the filter unit indicated with Arrows D-D in FIG. 8A.

FIGS. 8A and 8B show sectional views depicting the installation of second filtration device 40, whereby first filtration device 34 is installed in similar fashion but in mirrored orientation (as best seen in FIG. 7). First and second filtration device 34, 40, both of cylindrical filter type, are replaceably mounted generally in between an upper roof part 220 and a lower roof part 221 of roof assembly 22. Lower roof part 221 forms the support structure for the air filtration apparatus 24 and HVAC unit 26. Upper roof part 220 provides the overall cover to the ambient and is also extending vertically to form sidewalls. Both upper roof part 220 and a lower roof part 221 may additionally cooperate to form various ducts to guide the air as described in FIGS. 2 to 7. As mentioned before, openable covers 40C, 34C (with the open position indicated with 40C') are provided in the roof assembly, mainly the upper roof part 220 to enable access to the filtration device 34, 40. The filter device 34, 40 includes a filter medium body 401 which is arranged in circumferential orientation around an axis indicated with arrow C. The filter medium may be simple folded filter paper (suitable for CAT2) or activated carbon (suitable for CAT4). On a first end of the filter medium body 401, a connector end part 402 is moulded or injected to the body which includes a bore for air to exit through. On a second end of the filter medium body 401, a closing end part 403 is moulded to the body. Both connector end part 402 and closing end part 403 may be made from flexible material such as rubber, foam etc.

When replacing the filter positioning is very important to ensure proper operation. Firstly, the connector end part 402 of filtration device 40 is inserted onto a connecting socket 43 being mounted to the lower roof part 221 for connection with outlet 42. As vibration or rattling may cause the filtration device 40 to move unwanted along axis C and become loose resulting in unfiltered air entering the HVAC unit 26 and cab 12, further means are provided. In addition, the lower roof part 221 is provided with a support contour 221a which matches with the outer diameter of closing end part 403 in an assembled position to ensure proper positioning and support. Furthermore a stop contour 221b prevents movement of the filtration device 40 along axis C.

In similar manner, openable cover 40C is provided with a first contour 411 which prevents movement of the filtration device 40 along axis C and a second contour 412 which presses the filtration device 40 towards support contour 221a when closing the cover 40C. Second contour 412 is partly contacting along the circumference of filtration device 40 and is provided with a smaller diameter compared to the closing end part 403 to increase pressure and balance tolerances.

In the foregoing, the applicants have described an agricultural vehicle having an operator environment 12 with a roof portion 22, and an air treatment apparatus installed within the roof portion. The air treatment apparatus comprises a vehicle HVAC system 26 having an inlet plenum, other HVAC components 50, 52 and an outlet to the operator environment 12. The air treatment apparatus further comprises an air filtration system having at least one external inlet 28 and at least one filtration device 34 located between the external inlet 28 and the HVAC inlet plenum. The roof portion 22 is a hollow structure having upper and lower surfaces and front, rear, left and right sidewalls, and components 34, 38, 40, 46 of the air treatment apparatus are disposed along one of the left and right sidewalls within the hollow structure of the roof portion. The HVAC system 26 is preferably disposed along the rear sidewall within the hollow structure of the roof portion 22.

From reading the present disclosure, other modifications will be apparent to persons skilled in the art.

The invention claimed is:

1. An agricultural vehicle comprising an operator environment having a roof portion, and an air treatment apparatus installed within the roof portion, wherein the air treatment apparatus comprises:

a vehicle HVAC system having an inlet plenum, and an outlet to the operator environment; and an air filtration system having at least one external inlet and first and second filtration devices located in an air flow path between the at least one external inlet and the HVAC inlet plenum;

wherein the roof portion is a hollow structure having upper and lower surfaces and front, rear, left and right sidewalls, and the first and second filtration devices are both disposed along a same one of the left and right sidewalls within the hollow structure of the roof portion;

wherein the air filtration system comprises a valve mechanism operative to selectively connect either the first filtration device to the HVAC inlet plenum or the second filtration device to the HVAC inlet plenum;

wherein the air treatment apparatus comprises a first blower connecting the filtration devices and the HVAC system inlet plenum, the first blower being connected to each of the filtration devices by a respective duct and a second blower configured to produce a higher throughput of air than the first blower, the inlet of the second blower being connected in series with the outlet of the first blower, the second blower being disposed adjacent one of the first and second filtration devices.

2. The agricultural vehicle of claim 1, wherein each of the first and second filtration devices is cylindrical having a longitudinal axis, the first and second filtration devices being mounted with their longitudinal axes aligned.

3. The agricultural vehicle of claim 1, wherein the valve mechanism is positioned between the first and second filtration devices.

4. The agricultural vehicle of claim 1, wherein the HVAC system is disposed along the rear sidewall within the hollow structure of the roof portion.

5. The agricultural vehicle of claim 1, wherein the at least one external inlet comprises an opening in the lower surface of the hollow structure of the roof portion proximate one of the left and right sidewalls.

6. The agricultural vehicle of claim 5, wherein the at least one external inlet is positioned directly below one of the first and second filtration devices.

7. The agricultural vehicle of claim 1, further comprising a user-openable hatch in one of the left and right sidewalls of the roof portion providing user access to at least one of the first and second filtration devices.

8. The agricultural vehicle of claim 7, wherein the user-openable hatch extends to cover part of the one sidewall and part of the upper surface of the roof portion.

9. The agricultural vehicle of claim 1, wherein the air filtration system comprises:

a recirculation line having an inlet drawing air from the operator environment and an outlet upstream of the second blower.

10. The agricultural vehicle of claim 9, wherein the HVAC system is connected to the air filtration system via a duct, and the recirculation line comprises an air channel from the duct to the operator environment.

* * * * *